United States Patent [19]
Takeuchi et al.

[11] 3,958,834
[45] May 25, 1976

[54] AUTOMATIC ANTI-SKID BRAKING SYSTEM

[75] Inventors: Yasuhisa Takeuchi; Haruhiko Iizuka, both of Yokosuka; Mitsuhiko Ezoe, Yokohama, all of Japan

[73] Assignee: Nissan Motor Co., Ltd., Yokohama, Japan

[22] Filed: July 15, 1974

[21] Appl. No.: 488,413

[30] Foreign Application Priority Data
July 16, 1973   Japan............................ 48-79338
Mar. 13, 1974   Japan............................ 49-28859

[52] U.S. Cl............................. 303/21 BE; 303/20
[51] Int. Cl.²................................. B60T 8/02
[58] Field of Search............... 188/181; 303/20, 21; 307/10 R; 317/5; 324/161–162; 340/53, 62

[56] References Cited
UNITED STATES PATENTS
3,764,817   10/1973   Nakamura et al. ........ 303/21 BE X
3,790,227   2/1974   Dozier ............................ 303/21 BE
3,838,892   10/1974   Davis et al. ...................... 303/21 P Primary Examiner—Trygve M. Blix
Assistant Examiner—Stephen G. Kunin

[57] ABSTRACT

An unbraked condition sensor is incorporated in an automatic anti-skid braking system for use with a wheeled vehicle. The unbraked condition sensor comprising a timer, a comparator and an AND gate senses an unbraked condition and functions in such a manner that the AND gate produces a brake re-application output signal for reapplying braking force to the vehicle wheels in response to both a time-delayed output signal which is produced from the timer after a given time delay and a wheel deceleration output signal which is produced from the comparator when the wheel acceleration does not exceed a predetermined threshold value after releasing of the braking force. The predetermined time delay is adjustable.

1 Claim, 27 Drawing Figures

→ TIME

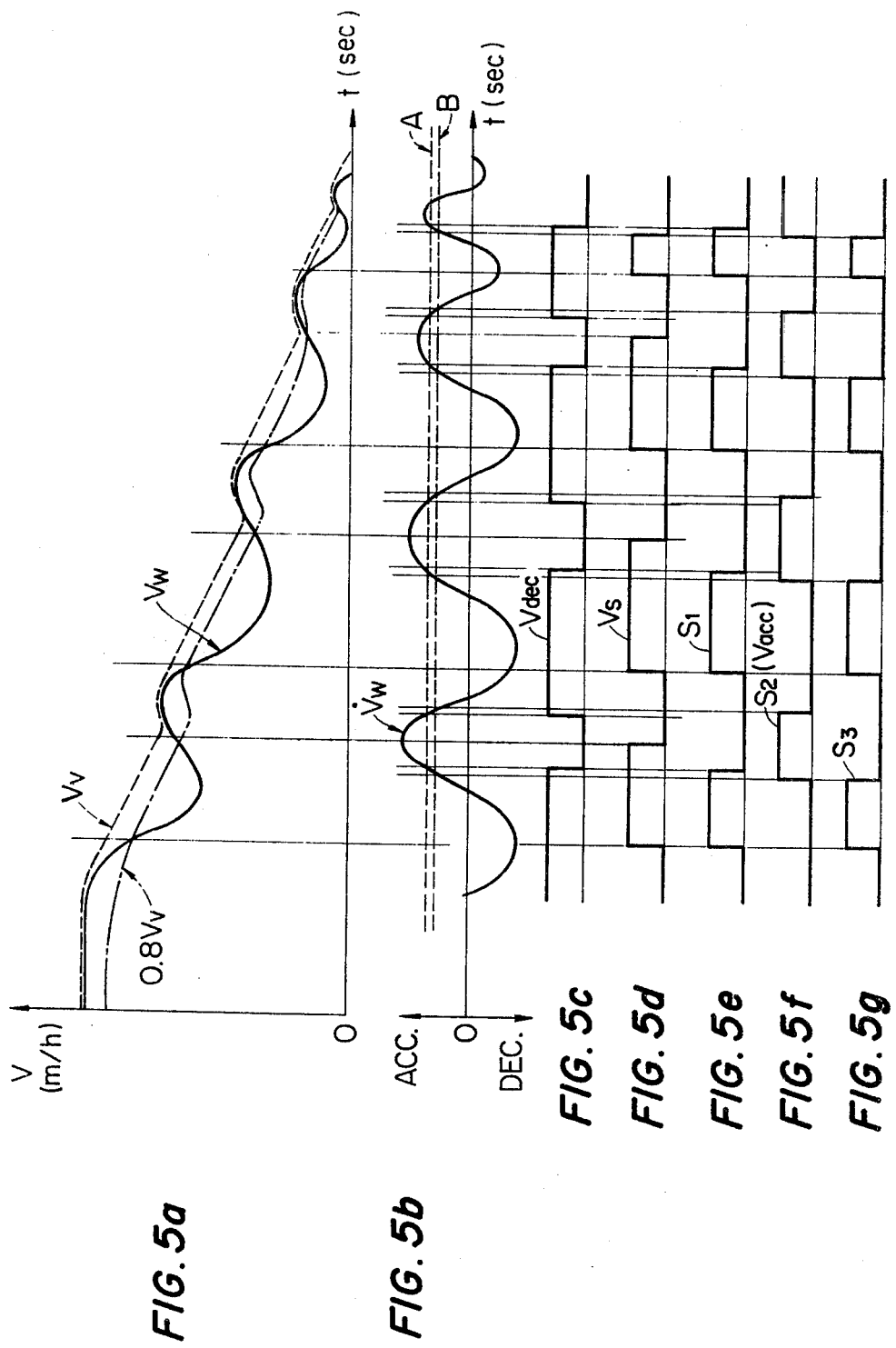

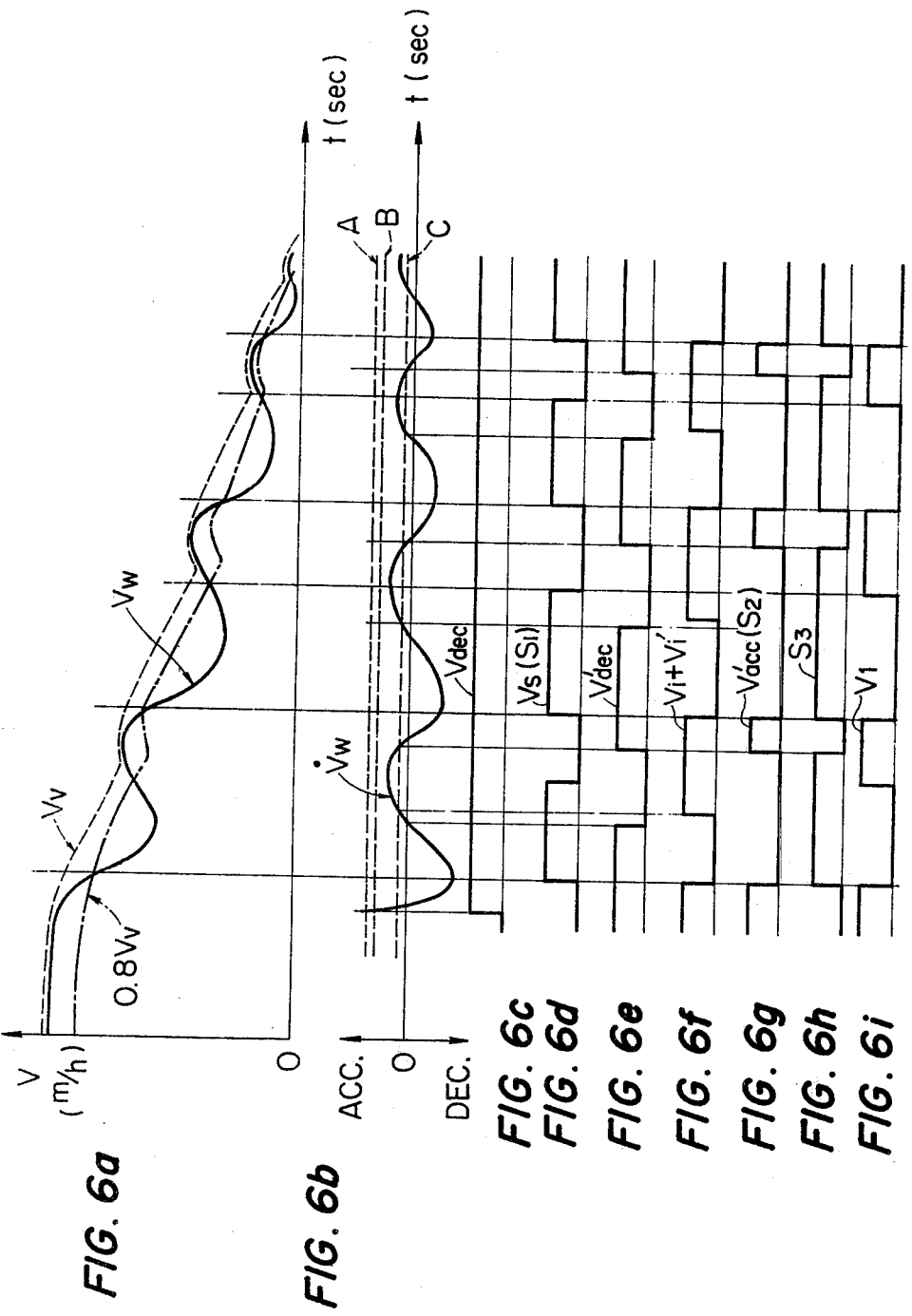

AUTOMATIC ANTI-SKID BRAKING SYSTEM

The present invention relates generally to an automatic anti-skid braking system and, more particularly, to an improved automatic anti-skid braking system which is adapted for use with wheeled vehicles and the like and which is capable of having the vehicle stopped in a shorter total time period and distance without skidding.

It is well known that the hydraulic pressure actuated braking systems of the vehicles are equipped with automatic anti-skid braking systems which are capable of preventing the vehicles from skidding or locking of the wheels and the resultant slipping of the vehicles when the maximum braking effort is applied to the wheels during an emergency stop.

Generally, in the prior art automatic anti-skid braking system, the anti-skid control is accomplished by detecting either mechanically or electrically the wheel peripheral deceleration due to the braking force applied thereto during emergency braking while cruising of the vehicle, by releasing forcedly the braking force applied to the wheels when the wheel peripheral deceleration exceeds a preset threshold value in order to prevent the wheel locking and the resultant vehicle slipping irrespective of whether or not the vehicle driver intentionally releases the braking force to the wheels, by reapplying the braking force to the wheels when the wheel peripheral re-acceleration exceeds a preset threshold value due to the friction coefficient of a road surface after the release of the braking force, and by repeating alternately such brake release and re-application operations over and again until the vehicle stops.

With the prior anti-skid braking systems described above, however, it sometimes happens that the wheel peripheral re-acceleration after releasing of the braking force to the wheels does not normally exceed sharply or quickly the preset threshold value to reapply the braking force to the wheels, for example, when the vehicle is running on a road such as a snowy frozen road surface where the friction coefficient is small, but the wheel peripheral re-acceleration rises abnormally gradually to approximately the actual vehicle speed. Thereafter, the wheel peripheral re-acceleration makes a slow descent together with the vehicle speed under an unbraked condition, that is, the vehicle goes on without brake effecting, resulting in the total braking time period and distance becoming extremely long. In order to solve this problem, the prior art anti-skid braking system is provided with a fail-safe device. The fail-safe device is, however, of the type which limits the time period of the brake release operation and never detects such a poor re-acceleration of wheels during the brake release operation as mentioned above, so that the fail-safe device cannot satisfactorily overcome the disadvantage mentioned above.

Thus, the prior art automatic anti-skid braking systems are inadequate and a serious problem remains to be solved.

It is accordingly an object of the present invention to provide an improved automatic anti-skid braking system for wheeled vehicles, which avoids the aforementioned shortcoming encountered in the prior art.

Another object of the present invention is to provide an improved automatic anti-skid braking system for wheeled vehicles, which prevents completely satisfactorily the vehicle from skidding under all driving conditions, especially during an emergency stop on a road such as a snowy frozen road surface where the friction coefficient is small.

A further object of the present invention is to provide an improved automatic anti-skid braking system for wheeled vehicles which is simple in construction and reliable in operation to have the vehicle stopped in a shorter total braking time period and distance under all driving conditions.

According to the present invention, the automatic anti-skid braking system for use with a wheeled vehicle is provided with a specific unbraked condition sensor which can detect an unbraked condition when a wheel re-acceleration does not rise above a predetermined threshold value after releasing of the braking force to the wheels. One preferred embodiment of the unbraked condition sensor of the present invention comprises a timer, a comparator and an AND gate in which the AND gate produces a brake re-application output signal for reapplying force to the wheels in response to both a time-delayed output signal which is produced from the timer after a predetermined time delay and a wheel deceleration output signal which is produced from the comparator when the wheel acceleration does not exceed a predetermined threshold value after releasing of the braking force. Another embodiment of the unbraked condition sensor comprises a comparator which produces an output signal in response to the wheel speed signal and the vehicle speed signal when the former is below the latter, another comparator which produces an output signal in response to the wheel acceleration signal when the wheel acceleration is below a predetermined threshold value, and an AND gate responsive to both the output signals from these comparators to produce a brake re-application output signal for reapplying the braking force to the wheels.

Other object, features, and advantages of the present invention will become more apparent from the subsequent description and the appended claims, taken in conjunction with the accompanying drawings, in which:

FIGS. 5a to 5g are graphic illustrations for explaining the operation of the present invention where the friction coefficient between the wheel and the road surface is large;

FIGS. 6a to 6i are graphic illustrations for explaining the operation of the present invention where the friction coefficient is small.

Figure 1:
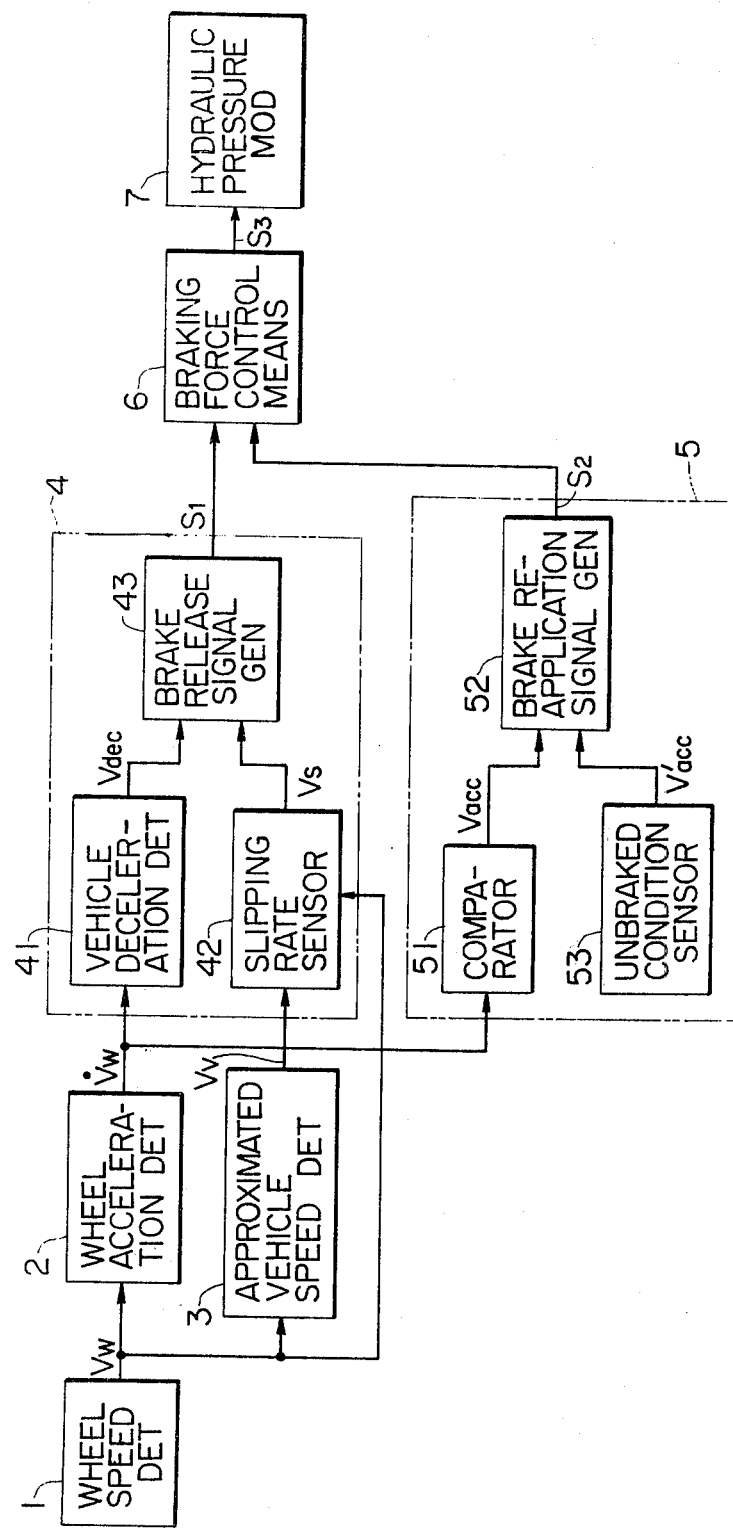
FIG. 1 is a schematic block diagram of an automatic anti-skid braking system in accordance with the present invention.

Referring more particularly to FIG. 1, a reference numeral 1 designates a wheel speed detector which is coupled with a wheel driving shaft or the like (not shown) and which produces an electric voltage signal $V_w$ proportional to the peripheral speed of vehicle wheels (not shown). A numeral 2 designates a wheel acceleration detector which produces an electric voltage signal $\dot{V}_w$ indicative of the peripheral acceleration speed of the vehicle wheels in response to the wheel speed signal $V_w$ from the wheel speed detector 1. A numeral 3 designates an approximated vehicle speed detector which produces an electric voltage signal $V_v$ analogous and approximated to the actual vehicle speed in response to the wheel speed signal $V_w$ from the wheel speed detector 1. It is to be noted that the deceleration rate of the approximated vehicle speed is, in this case, within the range of, for example, 0.85G – 1.00G (where 1G = 9.8m/sec$^2$), so that the approximated vehicle speed never exceeds the wheel speed even though the wheel speed increases during emergency braking (see FIGS. 5 a and 6a). The approximated vehicle speed signal $V_v$ and the wheel acceleration signal $\dot{V}_w$ are fed to a braking force releasing unit 4 which comprises a vehicle deceleration detector 41, a slipping rate sensor 42, and a brake release signal generator 43. The vehicle deceleration detector 41 is responsive to the wheel acceleration signal $\dot{V}_w$ and produces a deceleration output signal $V_{dec}$ when the magnitude of the wheel acceleration signal $\dot{V}_w$ exceeds a given threshold value. A slipping rate sensor 42 for detecting a slipping rate between the vehicle wheels and road surface is responsive to the wheel speed signal $V_w$ and the approximated vehicle speed signal $V_v$, and produces a slipping rate output signal $V_s$ when the slipping rate exceeds a given threshold value. In more detail, the slipping rate sensor 42 produces the slipping rate output signal $V_s$ under the condition that $V_v - V_w > SV_v$ where S is a preset slip rate and is, in this case, 0.2 so that this inequality may be changed to $0.8V_v > V_w$. The deceleration output signal $V_{dec}$ from the vehicle deceleration detector 41 and the slipping rate output signal $V_s$ from the slipping rate sensor 42 are fed to the brake release signal generator 43 which then produces a brake release signal $S_1$. It is to be appreciated that the braking force release unit 4 may be of any known type which can produce a brake release signal both when the wheel acceleration exceeds a given threshold value and the slipping rate exceeds a given threshold value.

A reference numeral 5 designates a braking force re-application unit which comprises a comparator circuit 51, a brake re-application signal generator 5 and an unbraked condition sensor 53. The comparator circuit 51 is responsive to the wheel acceleration signal $\dot{V}_w$ from the wheel acceleration detector 2 and produces an acceleration output signal $V_{acc}$ when the magnitude of the wheel acceleration signal $\dot{V}_w$ exceeds a set value which is, in this case, set within the range of 3G to 6G. The brake re-application signal generator 52 comprises an OR circuit having one input to which the acceleration output signal $V_{acc}$ is fed from the comparator circuit 51, and having an output from which a brake re-application signal $S_2$ is produced. It is to be noted that the above-mentioned comparator circuit 51 and the brake re-application signal generator 52 including the OR circuit may be substituted in lieu therefor any known type comparing means and OR gating means which function substantially similarly to the comparator circuit 51 and the OR circuit, respectively.

Figure 2:
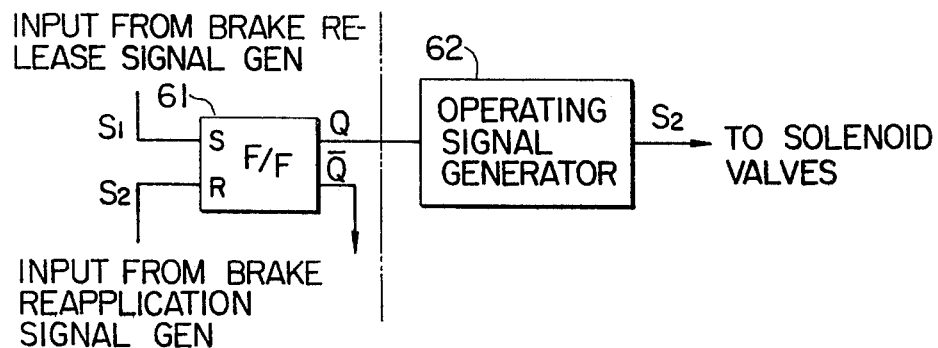
FIG. 2 is a schematic circuit diagram of a braking force control means shown in FIG. 1.

A reference numeral 6 indicates a braking force control means which is responsive to the brake release signal $S_1$ and the brake re-application signal $S_2$ in sequence from the brake release signal generator 43 and the brake re-application signal generator 52 respectively, and produces an operating signal $S_3$ in response to the brake release signal $S_1$. The operating signal $S_3$ is fed to a hydraulic pressure modulator 7 in which the solenoids (not shown) are then energized by the signal $S_3$, resulting in braking release valves (not shown) being actuated. The braking force control means 6, as shown in FIG. 2, comprises a flip-flop circuit 61 and an operating signal generating circuit 62. The flip-flop circuit 61 has one input S which receives the brake release signal $S_1$ as a set signal by which the flip-flop circuit 61 is set and produces an output signal Q, and another input R which receives the brake re-application signal $S_2$ as a reset signal by which the flip-flop circuit 61 is reset and produces an output signal $\overline{Q}$ which is inverted from the output signal Q. The output signal Q is fed to the operating signal generating circuit 62 comprising an operational amplifier which produces the operating signal $S_3$ which is fed to the solenoids of the hydraulic pressure modulator 7 (see FIG. 1). It is to be noted that the braking force control means 6 is not limited to the illustration of FIG. 2 and may be of any type well known in the art. Further, it is to be noted that any known type hydraulic pressure modulator may be usable as the hydraulic pressure modulator 7 of the present invention.

Since, as mentioned hereinbefore, the prior art braking force re-application unit of an automatic anti-skid braking system cannot sense satisfactorily such an unbraked condition where a wheel re-acceleration does not exceed a predetermined threshold value after releasing of the braking force to the wheels, for example, when the vehicle is running on a road such as a snowy frozen road surface where the friction coefficient is small, the braking force re-application unit cannot produce a brake re-application signal $S_2$ notwithstanding the actual vehicle speed increases. As the result, the vehicle goes on under an unbraked condition so that the vehicle cannot stop in a shorter total time period and distance without skidding. In order to solve the problem, the braking force re-application unit 5 of the present invention is provided with a specific sensor 53 which can sense such an unbraked condition and produce a brake re-application signal $S_2$ to be fed to the braking force control means 6. A first preferred embodiment of the unbraked condition sensor 53 of the present invention will be described below in detail with reference to FIGS. 3 and 4.

Figure 3:
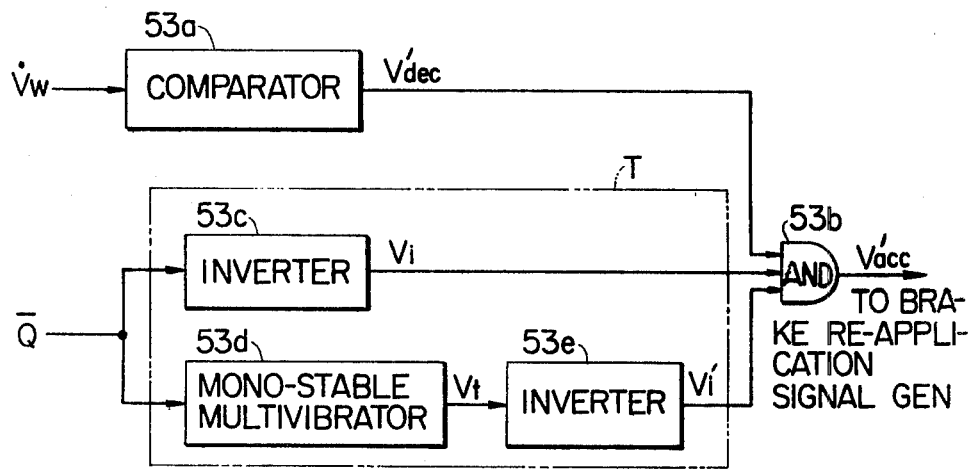
FIG. 3 is a schematic circuit diagram of one preferred embodiment of an unbraked condition sensor in accordance with the present invention shown in FIG. 1.
Figure 4A:
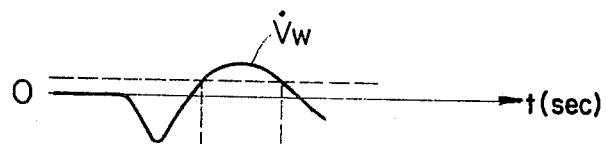
FIGS. 4a–4g are graphic illustrations for explaining the operation of the embodiment shown in FIG. 3.
Figure 4B:
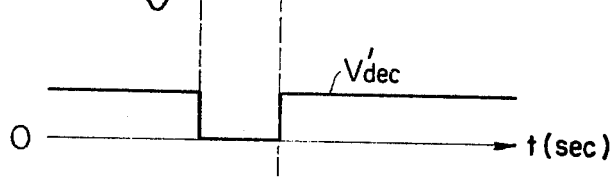
Figure 4C:
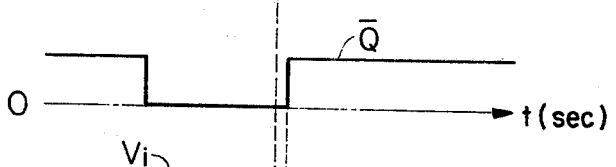
Figure 4D:
Figure 4E:
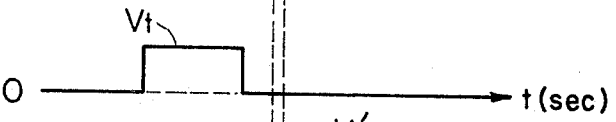
Figure 4F:
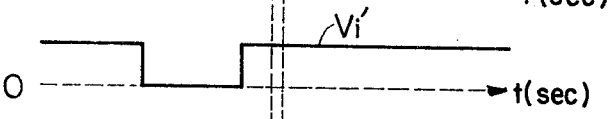
Figure 4G:
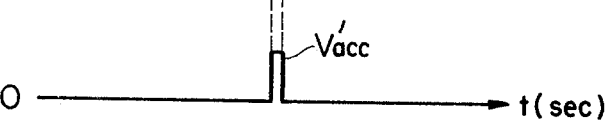

The unbraked condition sensor 53 shown in FIG. 3 comprises a comparator 53a, a timer circuit T shown by the dotted line and an AND circuit 53b. The comparator 53a is responsive to the wheel acceleration signal $\dot{V}_w$ (see FIG. 4a) from the wheel acceleration detector 2 and produces a deceleration output signal $V_{dec}{}'$ (see FIG. 4b) when the acceleration is below a set value, that is, the acceleration does not exceed the set value which is, in this case, set within the range of 0.3G to 0.6G. The timer circuit T comprises an inverter 53c, a mono-stable multivibrator 53d and another inverter 53e. The inverter 53c is responsive to the output signal $\overline{Q}$ (see FIG. 4c) from the flip-flop circuit 61 of the braking force control means 6 and produces an inverted output signal $V_i{}'$ as shown in FIG. 4d. The signal $\overline{Q}$ is further fed to the mono-stable multivibrator 53d which then produces an output signal $V_t$ as shown in FIG. 4e. The output signal $V_t$ is fed to the inverter 53e which then produces an inverted output signal $V_1{}'$ as a time-delayed signal, as shown in FIG. 4f. Thus, only when the AND circuit 53b receives all of the output signals $V_{dec}'$, $V_i$ and $V_i'$ from the comparator 53a, the inverters 53c and 53e respectively, does it produce an acceleration output signal $V_{acc}'$ (see FIG. 4g) to be fed to the brake re-application signal generator 52 of the brake re-application unit 5. It is to be noted that the predetermined time delay of the timer T may be adjustable in accordance with choice of the design of the flip-flop circuit 53d. It is further to be noted that the inverter 53c may be omitted if the signal Q is directly fed to the AND circuit 53b from the flip-flop circuit 61.

With the arrangement described above, the operation of the automatic anti-skid braking system of the present invention will now be described below in detail in conjunction with FIGS. 5a to 5g and 6a to 6i, in which the ordinate represents speed V (m/H) and the abscissa represents time $t$ (sec). In FIGS. 5a and 6a, the variations of the wheel speed $V_w$, the approximated vehicle speeds $V_v$ and $0.8V_v$ are illustrated by a solid line, a dotted line and a phantom line, respectively in the same voltage dimension. FIGS. 5b and 6b illustrate the variation of the wheel acceleration speed $V_w'$ with the set threshold values A, B and C of the vehicle deceleration detector 41 and the comparators 51 and 53a marked thereon. FIGS. 5c to 5g and 6c to 6i illustrate the output voltage signals which are already described hereinbefore.

First of all, a case wherein a braking force is applied to the wheels by actuating the braking system when the vehicle is running on a hardly slippery road surface, such as the surface of a dry asphalt road where the friction coefficient is large, will be explained with reference to FIGS. 5a to 5g. In this case, when the wheel acceleration speed $\dot{V}_w$ drops quickly below the set value A as shown in FIG. 5b after applying of the braking force, the vehicle deceleration detector 41 produces a deceleration output signal $V_{dec}$ as shown in FIG. 5c. On the other hand, when the wheel speed $V_w$ drops below the approximated vehicle speed $0.8V_v$ (see FIG. 5a), the slipping rate sensor 42 produces an output signal $V_s$ as shown in FIG. 5d. Consequently, the brake release signal generator 43 produces the brake release signal $S_1$ (see FIG. 5e) in response to both the deceleration output signal $V_{dec}$ and the output signal $V_s$ so that the braking force is released. Thereafter, the wheel acceleration speed $\dot{V}_w$ rises above the set value B of the comparator 51 so that the comparator 51 produces the acceleration output signal $A_{acc}$ and, accordingly, the brake re-application signal generator 52 produces the brake re-application signal $S_2$ as shown in FIG. 5g, with the result that the braking force is reapplied to the wheels. From the foregoing, thus, it will be seen that the braking force control means 6 in this case produces the operation signal $S_3$ as shown in FIG. 5g.

Next, a case wherein a braking force is applied to the wheels by actuating the brake system when the vehicle is running on a slippery road surface, such as the surface of a frozen road or a wet asphalt road where the friction coefficient is small, will be described with reference to FIGS. 6a to 6h. In this case, when the wheel acceleration speed $\dot{V}_w$ drops below the set value A as shown in FIG. 6b after applying of the braking force, the vehicle deceleration detector 41 produces a deceleration output signal $V_{dec}$ as shown in FIG. 6c. On the other hand, when the wheel speed $V_w$ drops below the vehicle speed $0.8V_v$, the slipping rate sensor 42 produces the output signal $V_s$ as shown in FIG. 6d. Consequently, the brake release signal generator 43 produces the brake release signal $S_1$ which is substantially similar to the output signal $V_s$ (see FIG. 6d) when receiving both the deceleration output signal $V_{dec}$ and the output signal $V_s$ so that the braking force is released. Thereafter, the wheel acceleration speed $\dot{V}_w$ increases gradually, but does not exceed the set value B of the comparator 51 as shown in FIG. 6b so that the comparator 51 does not produce the acceleration signal $V_{acc}$. At this time, the unbraked condition sensor 53 operates. When the wheel acceleration speed $\dot{V}_w$ is below the set value C of the comparator 53a (see FIG. 6b), the comparator 53a produces the deceleration output signal $V_{dec}'$ as shown in FIG. 6e. On the other hand, the timer circuit T produces a time-delayed output signal $V_i + V_i'$ as shown in FIG. 6f, so that the AND circuit 53b of the unbraked condition sensor 53 produces the acceleration output signal $V_{acc}'$ as shown in FIG. 6g in response to both the time-delayed output signal $V_i + V_i'$ from the timer circuit T and the acceleration output signal $V_{acc}'$ from the comparator 53a. The acceleration output signal $V_{acc}'$ is fed to the brake re-application signal generator 52 which then produces the brake re-application signal $S_2$ which is substantially similar to the acceleration output signal $V_{acc}'$ (see FIG. 6g), with the result that the braking force is reapplied to the wheels. From the foregoing, thus, it will be seen that the braking force control means 6 in this case produces the operating signal $S_3$ as shown in FIG. 6h.

Figure 7:
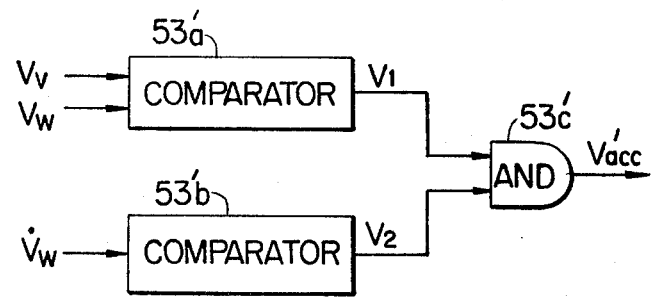
FIG. 7 is a schematic diagram of another preferred embodiment of the unbraked condition sensor shown in FIG. 1.

Reference is now made to FIG. 7 in which another embodiment of the unbraked condition sensor 53 of the present invention is shown. The unbraked condition sensor 53 comprises comparators $53_a'$ and $53_b'$ and an AND circuit $53_c'$. The comparator $53_a'$ is responsive to the approximated vehicle speed signal $V_v$ from the approximated vehicle speed detector 3 and the wheel speed signal $V_w$ from the wheel speed detector 1 and produces an output signal $V_1$ (see FIG. 6i) when the wheel speed $V_w$ is below the approximated vehicle speed $V_v$, or when, actually the wheel speed signal $V_w$ is above an approximated vehicle speed which is substantially less than the approximated vehicle speed $V_v$, and which is, in this case, $0.8V_v$ as shown in FIG. 6a taking errors in producing the wheel speed signal $V_w$ and the approximated vehicle speed signal $V_v$ into consideration. The comparator $53_b'$ is substantially similar to the comparator 53a shown in FIG. 3, that is, the comparator $53_b'$ is responsive to the wheel acceleration signal $\dot{V}_w$ from the wheel acceleration detector 2 and produce a deceleration output signal $V_2$ which is substantially similar to the deceleration output signal $V_{dec}'$ (see FIG. 6e) when the acceleration is below a set value, that is the wheel acceleration does not exceed the set value which is, in this case, set within the range of 0.3G to 0.6G, as mentioned above. The AND circuit $53_c'$ produces an output signal $V_{acc}'$ in response to both the signals $V_1$ and $V_2$ (see FIG. 6g). Thereafter, the braking force control means 6 produces an output signal $S_3$ as shown in FIG. 6h. The operation of the unbraked condition sensor shown in FIG. 7 is substantially similar to that of the unbraked condition sensor shown in FIG. 3 so that a more detailed description will be omitted for the sake of simplicity of the description.

What is claimed is:

1. An automatic anti-skid braking system for use with a wheeled vehicle having brakes actuated by hydraulic pressure, which comprises:
   wheel speed detecting means for detecting a wheel speed to produce a wheel speed signal analogous thereto;

wheel acceleration detecting means responsive to the wheel speed signal for producing a wheel acceleration signal analogous thereto;

approximated vehicle speed detecting means responsive to the wheel speed signal for producing a first approximated vehicle speed signal;

a braking force release unit responsive to the first approximated vehicle speed signal and the wheel acceleration signal for producing a brake release signal both when the wheel acceleration exceeds a given thershold value and a slipping rate exceeds a given threshold value;

a braking force re-application unit responsive to the wheel acceleration signal for producing a brake re-application signal when the wheel acceleration drops below a predetermined threshold value; and braking force control means responsive to the brake release signal and the brake re-application signal for producing a braking force control signal to control solenoid valves of a hydraulic modulator;

said braking force re-application unit comprising a first comparator circuit responsive to the wheel acceleration signal for producing a first acceleration output signal when the wheel acceleration exceeds a first set value; unbraked condition sensing means responsive to the wheel acceleration signal for sensing an unbraked condition when a wheel re-application is below a predetermined threshold value after releasing of the braking force and producing a second acceleration output signal in response thereto and brake reapplication signal generating means responsive to at least one of said first and second acceleration output signals for producing the brake re-application signal, in which said unbraked condition sensing means comprises: a timer circuit responsive to the braking force control signal from the braking force control means for producing a time-delayed output signal after a predetermined time delay; a second comparator circuit responsive to the wheel acceleration signal for producing an output signal when the wheel acceleration is below a second set value; and an AND circuit responsive to said time-delayed output signal from said timer circuit and said output signal from said second comparator circuit for producing said second acceleration output signal, and in which said timer circuit comprises: a first inverter for inverting the braking force control signal to produce a first inverted signal; a mono-stable multivibrator responsive to the braking force control signal to produce an output signal; and a second inverter for inverting said output signal from said mono-stable multivibrator to produce a second inverted signal whereby said first and second inverted signals are fed to said AND circuit together with said second acceleration output signal to produce the second acceleration output signal.

* * * * *